United States Patent [19]

Fink

[11] 4,107,917

[45] Aug. 22, 1978

[54] COUPLING LINK LOCKING ASSEMBLY

[75] Inventor: Richard H. Fink, York, Pa.

[73] Assignee: Campbell Chain Company, York, Pa.

[21] Appl. No.: 721,293

[22] Filed: Sep. 8, 1976

[51] Int. Cl.$^2$ ............................................. F16G 15/04
[52] U.S. Cl. ........................................ 59/85; 403/318
[58] Field of Search ............... 59/85, 86, 93; 403/318, 403/316, 317, 339, 408

[56] References Cited

U.S. PATENT DOCUMENTS

| 1,513,729 | 11/1924 | Adams | 59/85 |
| 2,369,344 | 2/1945 | Ehmann | 59/86 |
| 3,828,550 | 8/1974 | Fink | 59/85 |
| 3,916,616 | 11/1975 | Weidler | 59/85 |
| 3,959,909 | 6/1976 | Buschini | 59/86 |
| 3,962,755 | 6/1976 | Buschini | 59/86 |
| 3,962,810 | 6/1976 | Buschini | 43/8 |
| 3,962,811 | 6/1976 | Buschini | 59/86 |

FOREIGN PATENT DOCUMENTS

| 130,344 | 12/1950 | Sweden | 59/86 |
| 1,407,149 | 9/1975 | United Kingdom | 59/86 |

Primary Examiner—C.W. Lanham
Assistant Examiner—Gene P. Crosby
Attorney, Agent, or Firm—Maky, Renner, Otto & Boisselle

[57] ABSTRACT

A locking assembly to interconnect two adjacent members having axially aligned apertures includes a body member having a bore therethrough, a hinge pin with a locking groove therein passed through both the aligned apertures and the bore of said body, and retaining means positioned in said body and adapted to be received in the locking groove to hold the hinge pin in a preselected axial position. In one form, the retaining means consists of a locking pin driven into a blind end bore partially intersecting said longitudinal bore, the portion of said locking pin passing through said longitudinal bore being received in said locking groove. In another form, the retaining means comprises a spring clip slightly smaller than said longitudinal bore and being normally urged by biasing means into a position offset with respect to the axis of said longitudinal bore, whereby the spring clip is positively received and held in the locking groove of the hinge pin when in axial alignment therewith by the natural radial contraction of said spring clip and by the biasing means forcing the spring clip to an offset position.

5 Claims, 7 Drawing Figures

COUPLING LINK LOCKING ASSEMBLY

BACKGROUND OF THE INVENTION

This invention relates to a locking assembly for interconnecting two adjacent members with aligned apertures therethrough, such locking assembly being particularly suited to coupling links and similar chain type connections although certainly not being limited to such environment.

Coupling links comprising two generally U shape half links hingedly joined by means of a pin held in position by some form of locking mechanism are well known in the art. Reference my be had, for example, to Fink U.S. Pat. No. 3,828,550, assigned to the assignee of the present invention. Reference may also be had to U.S. Pat. Nos. 1,513,729; 3,134,221 and 3,373,560 described in the background of the Fink patent.

The coupling link disclosed in the Fink patent has been operationally and commercially quite successful. Such coupling link includes a retaining means for the coupling link hinge pin consisting of a body having a bore therethrough and a counterbore at one end thereof and a spring clip retained in said counterbore with the inner diameter of said spring clip being slightly smaller than the bore of the body and in coaxial alignment therewith embracingly to engage a central locking groove on the hinge pin to fix the axial position of the same. This spring type retention means provides a tight and dependable axial lock for the hinge pin under normal conditions of operation.

Occasionally, however, the coupling link is intentionally tampered with in an attempt to disassemble the coupling link. Although the retention means disclosed in the Fink application will resist relatively high axial loads on the hinge pin, the coupling link can be disassembled when the axial load reaches a magnitude sufficient radially to expand the spring clip to permit the pin to be released.

Accordingly, it is the primary object of the present invention to provide a locking assembly for interconnecting coupling half links or the like that is easily assembled but not easily disassembled. This object is accomplished by hinge pin retaining means consisting of either a drive pin received in a blind end bore in the locking assembly body or a spring clip in the locking assembly body being urged to a position offset with respect to the axis of the body bore. Both of these retention forms are relatively easily manufactured and installed and provide a coupling link that resists disassembly.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

DESCRIPTION OF THE PREFERRED EMBODIMENTS

Figure 1:
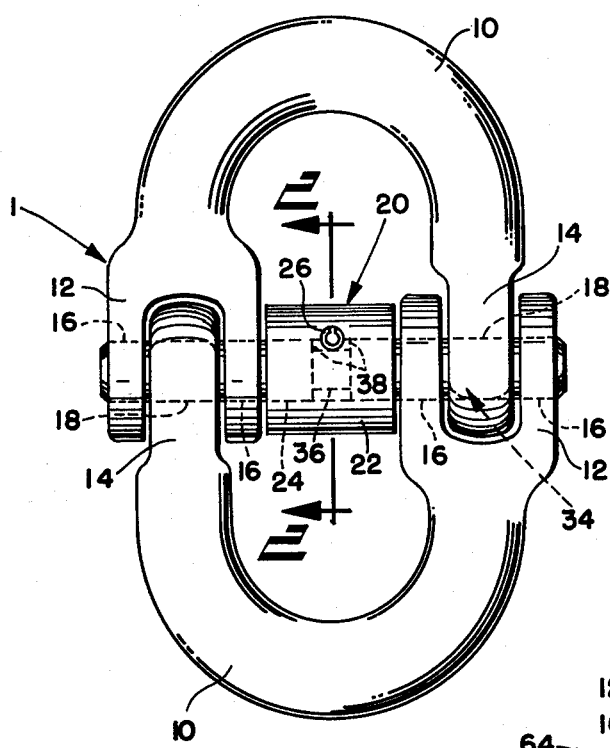
FIG. 1 is an elevation of an assembled coupling link employing the drive pin to lock the hinge pin in a preselected axial position.

Referring now to FIG. 1, the coupling link indicated generally at 1 includes two substantially identical U shape half links 10, each of which has a clevis 12 at the terminal portion of one leg and a tongue-like projection 14 at the terminal portion of the other leg. The clevis and tongue portions are respectively provided with apertures 16 and 18 that are in axial alignment when the ends of the half links are interdigited by positioning the tongues 14 in the opposing clevises 12 as shown in FIG. 1. A locking assembly indicated generally at 20 is employed hingedly to interconnect the U shape half links 10 at their interdigited ends.

Figure 2:
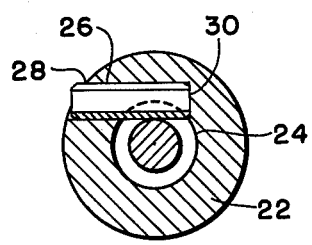
FIG. 2 is a cross-section taken along line 2—2 of FIG. 1 showing the interrelationship between the drive pin, the locking assembly body, and the hinge pin with groove.

Such locking assembly 20 includes a cylindrical body member 22 interposed between the interdigited ends of the half links and substantially spanning the distance therebetween. Such cylindrical body 22 has a first, longitudinal bore 24 extending therethrough from end to end. Such body 22 has a second, transverse bore 26 therein which partially intersects the longitudinal bore 24, a best shown in FIG. 2. The second transverse bore 26 has an exposed open end 28 and a blind end 30 within the body 22.

The locking assembly 20 also includes a hinge or joining pin indicated generally at 34. Such hinge pin 34 includes a central annular locking groove 36 of reduced diameter having spaced sidewalls 38 that are perpendicular to the longitudinal axis of the hinge pin 34. The hinge pin 34 is substantially coextensive in length to the overall width of the coupling link with interdigited ends as best shown in FIG. 1 wherein the ends of the hinge pin 34 are just slightly exposed at each side thereof when assembled.

To assemble the U shape half links 10 into a coupling link 1, the ends of the U shape half links 10 are interdigited once the chains to be joined thereby are respectively received on the curved shanks of such U shape half links. The cylindrical body member 22 is then positioned between the interdigited half links and the hinge pin 34 inserted until both ends of the same are just visible at the lateral extremes of the coupling link. Such position of the hinge pin 34 places the locking groove 36 thereof in transverse alignment with the second, transverse bore 26 in body 22.

A locking pin 42 is then driven through opening 28 into the second, transverse bore 26. Such locking pin is driven until the leading edge thereof abuts the blind end 30 of the bore 26, with the portion of the locking pin 42 passing through the longitudinal bore 24 being received in the groove 36 tightly to hold the hinge pin 34 in the preselected axial position. The sidewalls 38 of the groove 36 and the tight fit of the drive pin 42 in transverse bore 26 do not permit the locking assembly to be disassembled by axial loads placed upon the hinge pin 34. Moreover, the blind end 30 of the second, transverse bore 26 precludes access to the drive pin 42 from the other side of the body 22 whereby the same cannot be removed therefrom by application of a reverse driving force. As illustrated, the locking or drive pin 42 is a roll-type pin having abutted but slightly spaced ends permitting radial contraction of the same during driving for a tight frictional fit with the second transverse bore. Alternatively, other structural forms, such as a grooved drive pin, could be used to accomplish the same purpose.

Figure 3:
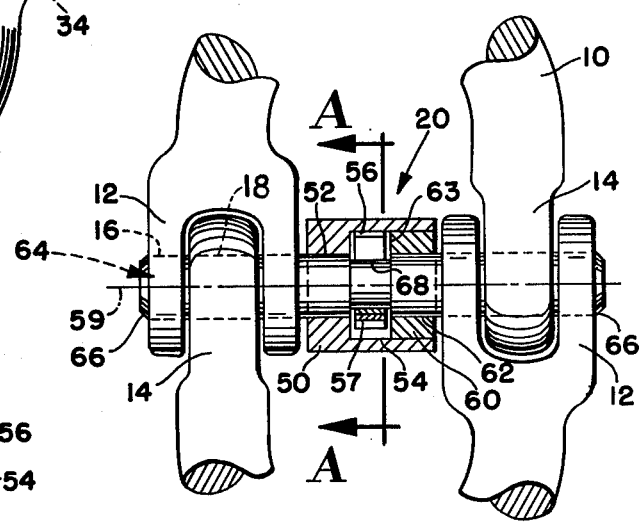
FIG. 3 is a partial elevation of an assembled coupling link showing in section an alternative locking assembly with spring clip and biasing means.
Figure 4:
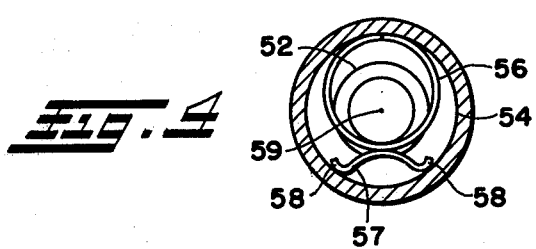
FIGS. 4 through 6 are identical sections generally taken along line A—A of FIG. 3 showing the sequence of assembly from initial hinge pin insertion (FIG. 4), to partial hinge pin insertion (FIG. 5) to final hinge pin insertion with the spring clip received in the locking groove (FIG. 6).

Referring now to FIGS. 3–6, a second form of locking assembly has been illustrated wherein like parts to the first form have been denoted by like numerals. As best shown in FIG. 3, the locking assembly 20 includes a generally cylindrical body 50 having a longitudinal bore 52 therethrough and a coaxial counterbore 54 of larger diameter at one end thereof. A split spring clip 56 is positioned near the blind end of the counterbore 54. One side of the spring clip 56 is engaged by a U shape biasing device 57 made from spring steel or the like. Such U shape biasing device has rounded ends 58 that engage the inner diameter of the counterbore 54 while the central portion thereof engages the outer diameter of the spring clip 56 normally to urge same to a position offset with respect to the longitudinal axis 59 of the body 50. As best shown in FIG. 4, such offset position of the spring clip 56 results in a portion thereof spatially intersecting the imaginary continuation of bore 52 into counterbore 54.

The spring clip 56 and biasing device 57 may be held in position by a sleeve 60, which is received in the counterbore 54 and connected to the body 50. Such sleeve 60 has a bore 62 therethrough that is equal in diameter to and coaxial with the bore 52. The leading or inserted edge 63 of said sleeve 60 forms a shoulder positively to engage and retain the spring clip 56 and biasing device 57.

The locking assembly 20 in the form shown in FIGS. 3 through 6 also includes a hinge pin 64 having chamfered ends 66 and a centrally positioned locking groove 68 of reduced diameter. Such pin 64 is substantially coextensive in length with the width of the coupling link 1 and has a diameter just slightly smaller than the diameter of bore 52.

Figure 5:
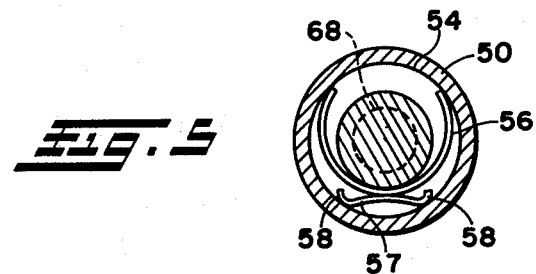
Figure 6:
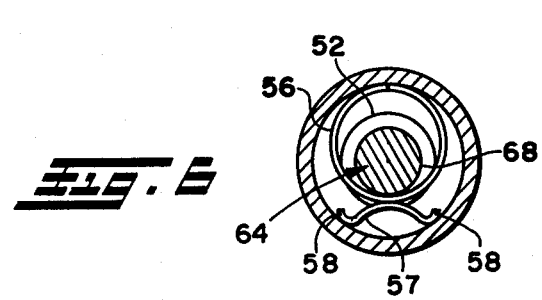

For purposes of assembly, the ends of the half links 10 are interdigited once the chains to be joined by the coupling link 1 are respectively positioned about the curved shanks of such half links. The cylindrical body member 50 is then positioned between the interdigited ends so that the bore therethrough is in axial alignment with the holes 16 and 18 in the clevis and tongue ends of the half links. The hinge pin 64 is then advanced through either side of the interdigited ends and into the cylindrical body 50. The sequence of the hinge pin assembly movement through the cylindrical body 50 is illustrated in FIGS. 4 through 6.

As shown in FIG. 4, the chamfered end 66 of pin 64 is just engaging the split spring clip 56. Continued advancement of the pin 64 results in the chamfered end 66 camming the spring clip 56 from its normally offset position of FIG. 4 to a position coaxial with the longitudinal axis of the body 50 as shown in FIG. 5. This camming movement results in the split spring clip 56 spreading to surround the major diameter of the hinge pin 64 as it moves therethrough and also results in the ends 58 of the biasing device 57 spreading apart with the center portion thereof flattening out to permit the lateral movement of the spring clip 56 to a coaxial position. When the hinge pin 64 has been advanced to the fully inserted FIG. 3 position, the locking groove 68 therein of reduced diameter is axially aligned with the spring clip 56. As such point, the spring clip naturally radially contracts due to the elastic nature of the material tightly to embrace the locking groove 68 as shown in FIG. 6. Simultaneously, the biasing device 57 made from spring material also returns to its original shape positively to drive the spring clip 56 into its offset position, thereby to hold such spring clip in the locking groove. The use of the biasing device 57 as an additional retention means to the contraction of the split ring spring clip 56 acts to increase the load necessary to separate the locking assembly.

Figure 7:
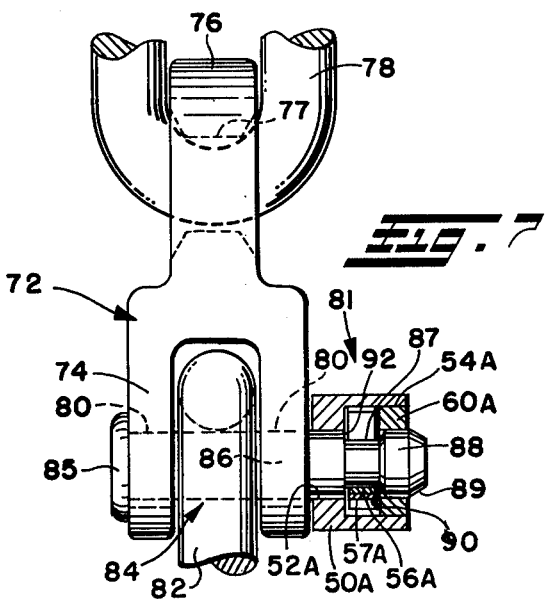
FIG. 7 is a partial elevation of a locking assembly similar to that shown in FIGS. 3 through 6 but illustrated in combination with a clevis-type joining link.

Referring now to FIG. 7, a joining link indicated generally at 72 includes a clevis 74 at one end thereof and an oppositely extending flange 76 at the other end thereof. Such flange 76 is provided with an aperture 77 therethrough which receives the terminal link 78 of a first length of chain. The clevis 74 is provided with aligned apertures 80 which cooperate with the locking assembly, indicated generally at 81, to connect the terminal link 82 of another length of chain to the joining body, thereby selectively to interconnect the two lengths of chain.

The body member of the locking assembly 81 is substantially identical in structure to the body member disclosed in FIGS. 3 through 6, and accordingly the same reference numerals with the suffix A have been used thereon. The body member indicated generally at 50A cooperates with a pin 84 having a head 85, a shank 86, a reduced diameter locking groove 87, a tip 88 of equal diameter to shank 86, and a chamfered leading end 89. The locking groove 87 has one inclined or tapered sidewall 90 at the leading edge thereof and a second sidewall 92 oriented generally perpendicularly to the axis of the pin 84.

To connect link 82 to the clevis 74, the body member 50A is positioned adjacent such clevis axially to align the apertures 80 with the bore 52A, and the link 82 is then internested in the clevis 74 so that the open center thereof is similarly in axial alignment with such apertures. The pin 84 is then driven through the clevis and into the body member 50A moving from left to right as viewed in FIG. 7. During advancement of the pin through body member 50A, the chamfered leading end 89 cams the offset split spring clip 56A into a coaxial position with respect to the body member 50A thereby permitting the pin to pass. When the locking groove 87 is brought into axial alignment with the split spring clip 56A, the latter naturally contracts to embrace the locking groove and is simultaneously driven into the same by the U shape biasing spring 57A.

If disassembly of the connection just described is desired, the leading end of pin 84 may be driven from right to left as viewed in FIG. 7. The tapered sidewall 90 of locking groove 87 engages the spring clip 56A during such pin movement and cams the same outwardly into coaxial position with respect to the body 50A to permit the pin to be released. The angularity of the taper for the inclined wall of the groove 87 may be varied depending upon the desired degree of difficulty for disassembly. As the inclined wall or shoulder 90 of the groove 87 approaches an orientation peripendicular to the axis of the pin 84, the connection formed by the locking assembly requires greater axial forces to be exerted on the pin to effect disassembly.

The use of the locking assembly 81 in combination with the clevis 74 has been illustrated and described in context with FIG. 7 to demonstrate the versatility of the invention disclosed herein. It will be appreciated, of course, that the locking assembly of FIGS. 1 and 2 could also be used with clevis 74. In fact, the locking assemblies disclosed herein can be used to interconnect any two members having apertures therein that can be axially aligned.

Other modes of applying the principles of the invention may be employed, change being made as regards the details described, provided the features stated in any of the following claims, or the equivalent thereof be employed.

The embodiments of the invention in which an exclusive property or privilege is claimed are defined as follows:

1. A locking assembly for interconnecting two members having aligned apertures therein comprising a hinge pin having a groove therein inserted through said aligned apertures, retention means to hold the hinge pin in a preselected axial position in which the members are coupled to said hinge pin for interconnection, said retention means including a blind end bore intersecting and aligned with the hinge pin groove when the hinge pin is inserted and a locking pin driven into said blind end bore for partial receipt in said hinge pin groove to effect the couple, with the inserted end of the pin being enclosed by the bind end bore to preclude removal of such locking pin by a reverse driving force.

2. The locking assembly of claim 1 wherein said retention means further includes a body having a first bore extending longitudinally therethrough in alignment with the apertures in said members to have said inserted hinge pin commonly extend therethrough and having the blind end bore therein extending transversely of and partially intersecting with said longitudinal bore to be in alignment with the hinge pin groove when the hinge pin is inserted.

3. The locking assembly of claim 2 wherein the locking pin is rolled strip material having abutted, closely spaced opposed ends permitting slight radial contraction upon the locking pin being driven into said blind end bore in tight frictional engagement therewith, the leading end of said locking pin being driven into engagement with the end of said blind end bore.

4. The locking assembly of claim 2 wherein the locking pin has a grooved shank tightly frictionally engaging the wall of the blind end bore during and after driving, the leading end of said locking pin being driven into engagement with the end of said blind end bore.

5. The locking assembly of claim 2 wherein said groove in said hinge pin has spaced, parallel side walls at substantially right angles to the longitudinal axis of the hinge pin.

* * * * *